United States Patent
Yamada

(10) Patent No.: US 8,824,007 B2
(45) Date of Patent: Sep. 2, 2014

(54) IMAGE PROCESSING APPARATUS AND IMAGE FORMING APPARATUS THAT FORMS AN IMAGE USING AN ELECTROPHOTOGRAPHIC PROCESS

(75) Inventor: Toshiyuki Yamada, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 103 days.

(21) Appl. No.: 13/478,386

(22) Filed: May 23, 2012

(65) Prior Publication Data

US 2012/0314233 A1 Dec. 13, 2012

(30) Foreign Application Priority Data

Jun. 8, 2011 (JP) ................................. 2011-128641

(51) Int. Cl.
*G06F 15/00* (2006.01)

(52) U.S. Cl.
USPC .............................. 358/1.9; 358/3.32; 347/14

(58) Field of Classification Search
None
See application file for complete search history.

(56) References Cited

U.S. PATENT DOCUMENTS

| | | | |
|---|---|---|---|
| 2007/0047985 A1* | 3/2007 | Kamijo et al. | 399/45 |
| 2007/0147862 A1* | 6/2007 | Nakamura et al. | 399/45 |
| 2010/0195163 A1* | 8/2010 | Oki | 358/3.23 |
| 2011/0193905 A1* | 8/2011 | Miyamoto | 347/14 |

FOREIGN PATENT DOCUMENTS

| | | |
|---|---|---|
| JP | 2000-321885 A | 11/2000 |
| JP | 2006-78883 A | 3/2006 |

* cited by examiner

*Primary Examiner* — Firmin Backer
*Assistant Examiner* — Helen Q Zong
(74) *Attorney, Agent, or Firm* — Fitzpatrick, Cella, Harper & Scinto

(57) ABSTRACT

A texture processing unit obtains smoothness information from a paper type specifying unit or a smoothness measuring device, and a lookup table is selected corresponding to the smoothness. An image area division unit divides off image signals of a predetermined hue area from among converted image signals. Predetermined hue area refers to a hue area in which, among multiple areas of different hues, a toner transfer failure tends to occur at concave portions that exist on a printing surface of a printing medium. The image signal processing unit applies the lookup table selected by the texture processing unit on the image signals that have been divided off, thereby increasing the toner amounts at concave portions.

10 Claims, 9 Drawing Sheets

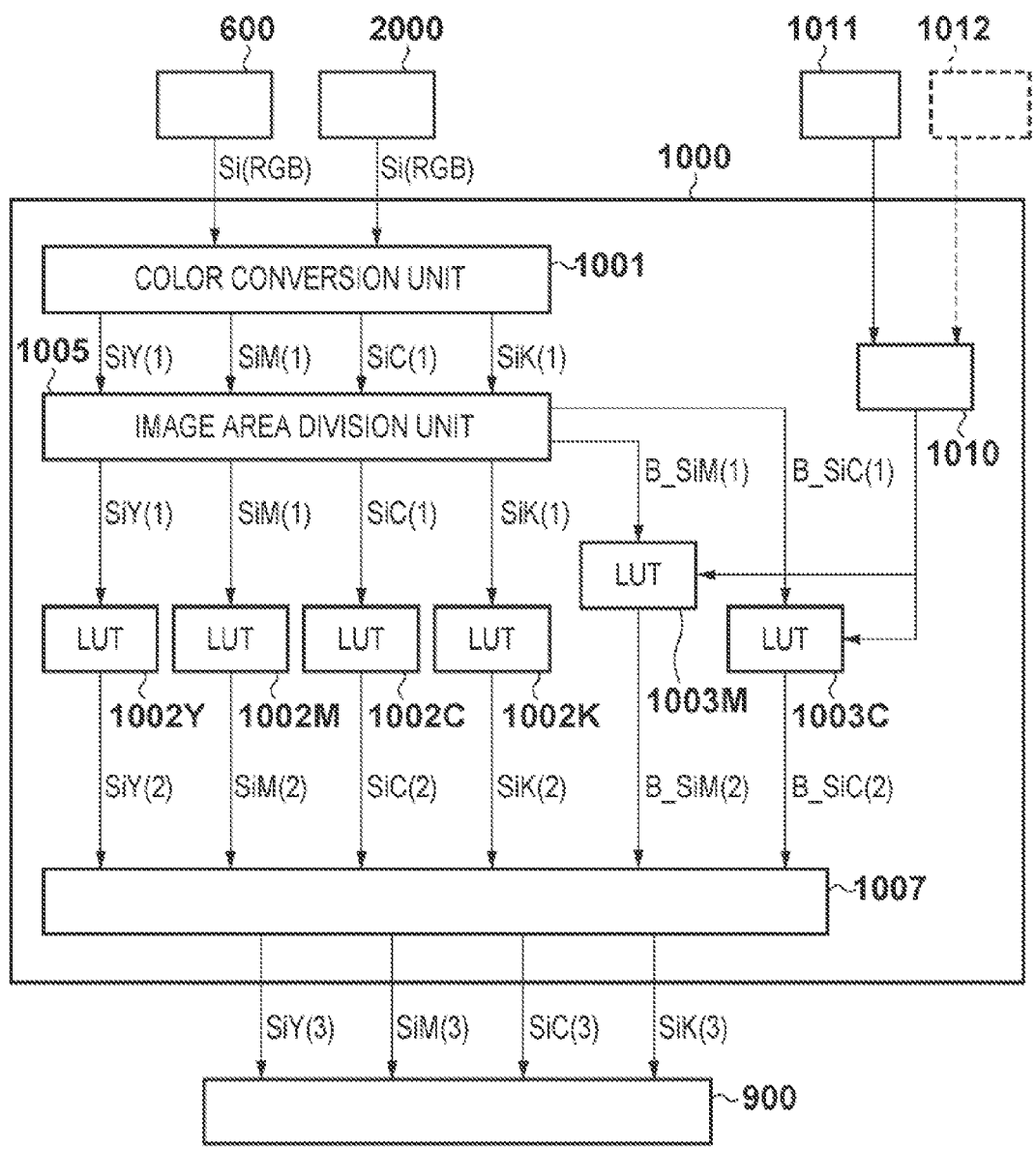

FIG. 6
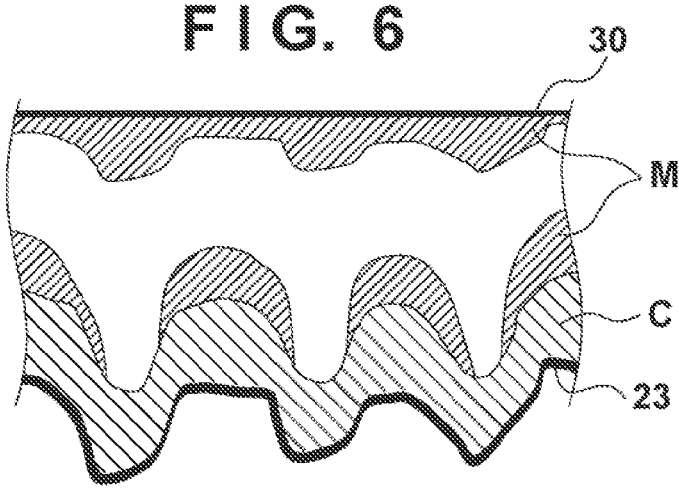
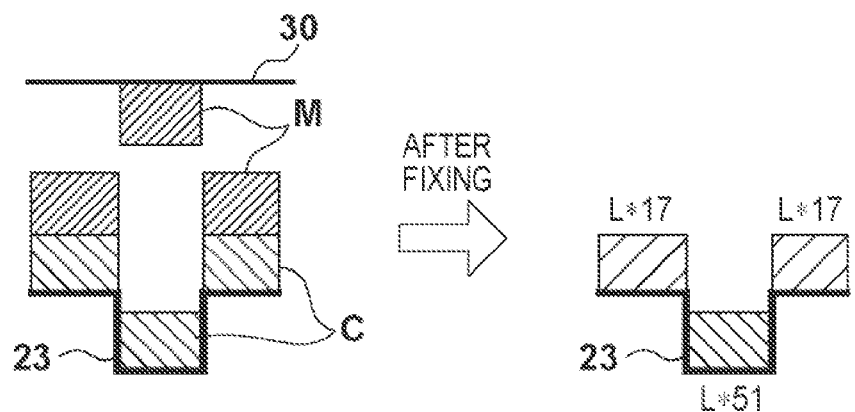
FIG. 7A   FIG. 7B
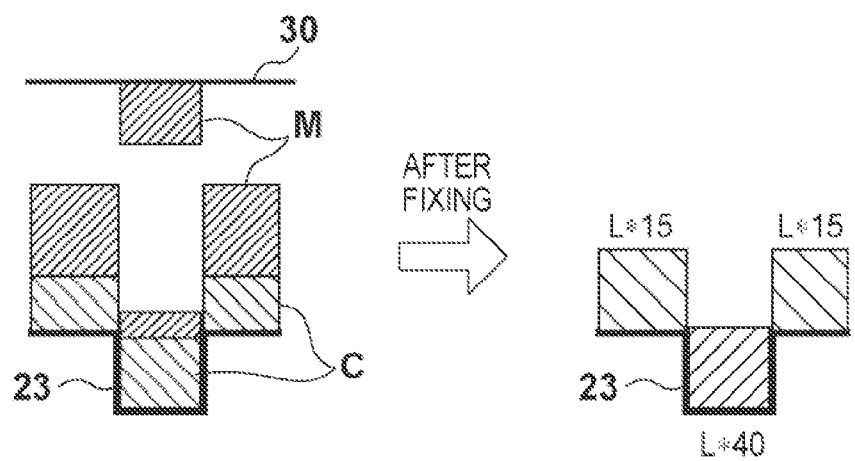
FIG. 7C   FIG. 7D

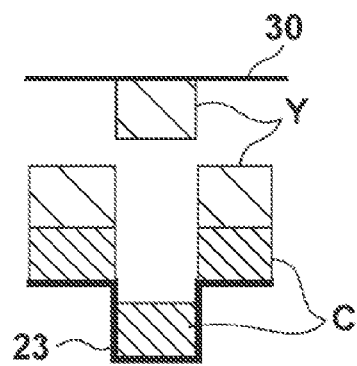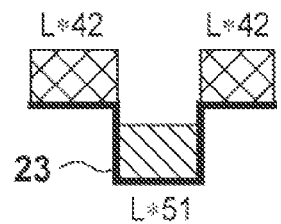
F I G. 10A    F I G. 10B
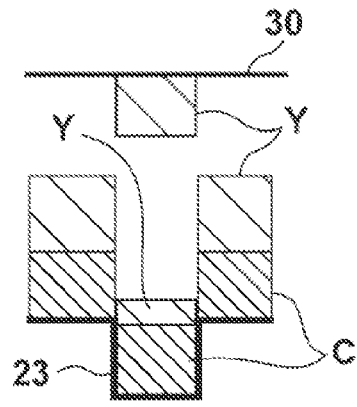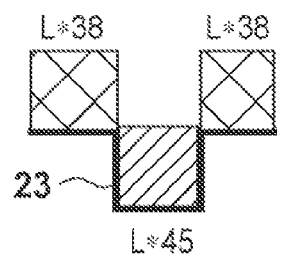
F I G. 10C    F I G. 10D
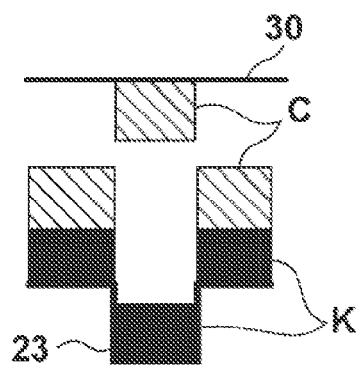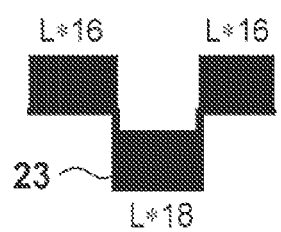
F I G. 11A    F I G. 11B

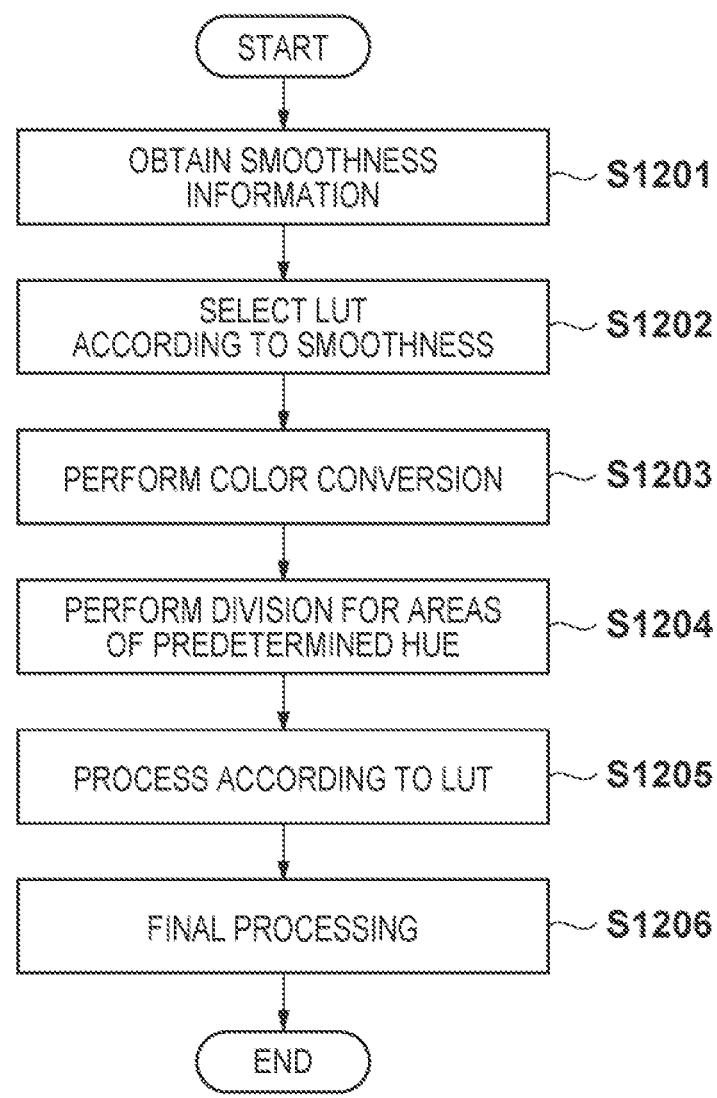

IMAGE PROCESSING APPARATUS AND IMAGE FORMING APPARATUS THAT FORMS AN IMAGE USING AN ELECTROPHOTOGRAPHIC PROCESS

BACKGROUND OF THE INVENTION

1. Field of the Invention

The present invention relates to image processing apparatuses and image forming apparatuses that form an image using an electrophotographic process.

2. Description of the Related Art

Electrophotographic image forming apparatuses transfer a toner image, which has been developed on a photosensitive member, to a printing medium. The efficiency of toner image transfer is dependent on the surface properties (texture) of the printing medium. Texture refers to the state of fiber distribution in a paper. In particular, toner images are not transferred sufficiently for papers having a low level of smoothness such as papers where there is significant roughness in the paper. Accordingly, Japanese Patent Laid-Open No. 2000-321885 proposes an invention in which a transfer surface of an intermediate transfer member is constituted by an elastic member, and reductions in transferability at concave portions are prevented by causing the transfer surface to follow the concave portions of the printing medium. Furthermore, Japanese Patent Laid-Open No. 2006-78883 proposes an invention in which a white toner or a transparent toner is used prior to image forming of a colored toner to smooth the surface of the transfer paper.

With the invention described in Japanese Patent Laid-Open No. 2000-321885, there is a risk that the toner cleaning properties of the surface of the intermediate transfer member will be greatly reduced. Furthermore, in regard to belt-shaped intermediate transfer members, there is also a risk that production costs will greatly increase. Since a white toner or transparent toner is used in the invention described in Japanese Patent Laid-Open No. 2006-78883, this requires increased costs in toner itself and materials for forming layers of these toners, which unfortunately incurs increases in the overall size and costs of the image forming apparatus.

SUMMARY OF THE INVENTION

Accordingly, a feature of the present invention is to enable toner images to be transferred sufficiently to printing media having poor surface properties while reducing costs more than heretofore.

According to the present invention, the correction unit enables a toner image to be sufficiently transferred to a printing medium having poor surface properties by increasing the toner amounts, among multiple areas having different hues, at hue areas where toner transfer failures tend to occur at concave portions on the surface of the medium. Furthermore, since processing or mechanisms for smoothing the printing medium by using a white toner or transparent toner in advance are unnecessary, there are advantageous aspects in terms of costs compared to heretofore. Furthermore, since it is not necessary to implement an elastic member as the surface material of the intermediate transfer member or the like, there are advantageous aspects in terms of costs compared to heretofore.

Further features of the present invention will become apparent from the following description of exemplary embodiments (with reference to the attached drawings).

BRIEF DESCRIPTION OF THE DRAWINGS

FIG. 2 is a schematic diagram indicating processing conditions in an image processing portion during image formation.

FIG. 6 is a diagram indicating a condition of a texture fault of paper.

FIGS. 7A to 7D are schematic diagrams indicating conditions of texture faults of a blue image.

FIGS. 10A to 10D are schematic diagrams indicating conditions of texture faults of a green image.

FIGS. 11A and 11B are schematic diagrams indicating conditions of texture faults of an image in a case where black toner is applied.

FIG. 12 is a flowchart indicating image processing in an embodiment of the present invention.

DESCRIPTION OF THE EMBODIMENTS

Hereinafter, further detailed description is given of embodiments according to the present invention with reference to the accompanying drawings.

Figure 1:
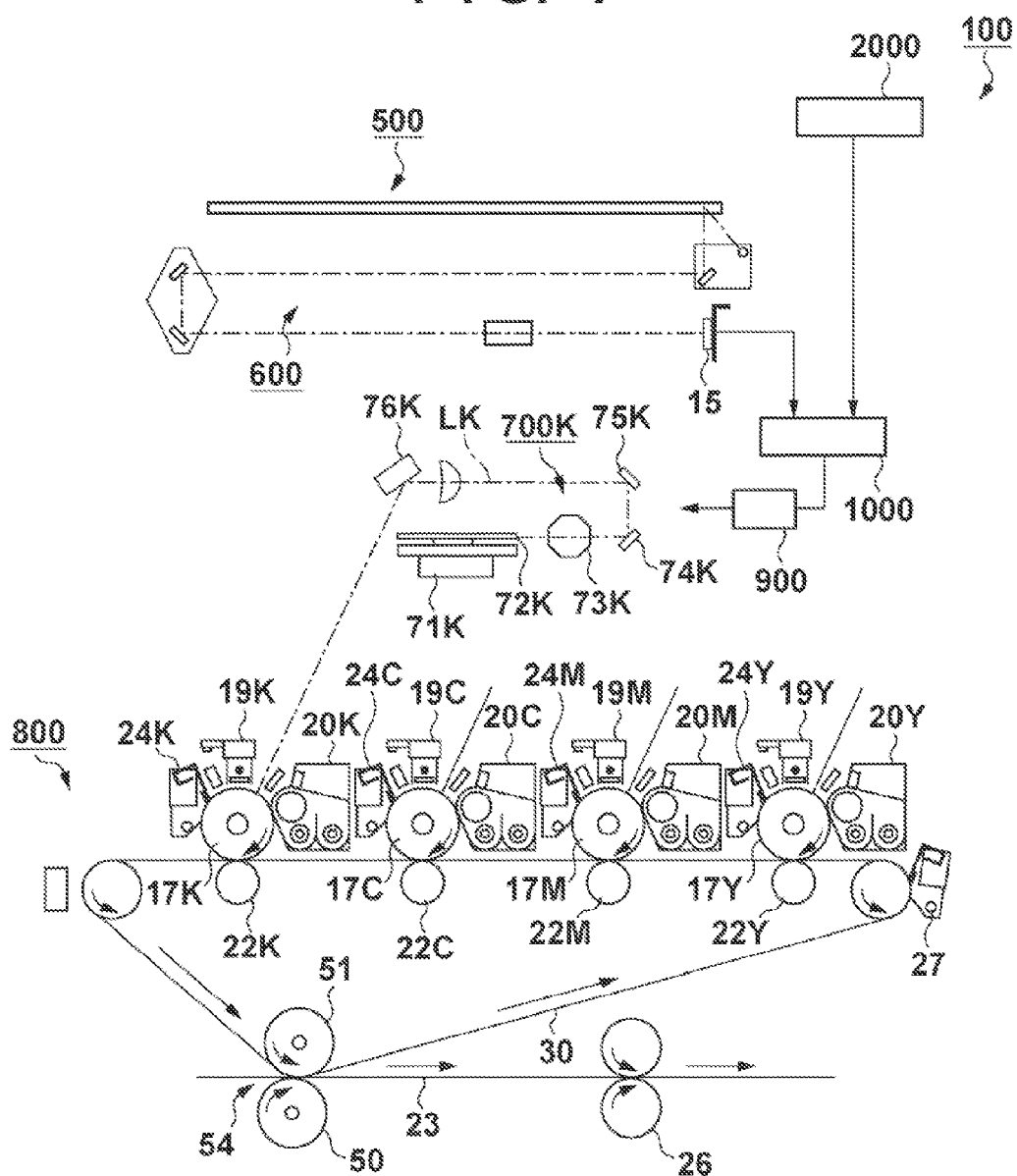
FIG. 1 is an outline configuration diagram of an image forming apparatus.

The image forming apparatus 100 indicated in FIG. 1 is a copier that forms a multicolor image using four toners of different colors. Here, the four colors are yellow (Y), magenta (M), cyan (C), and black (K). It should be noted that when description is given in regard to each of the units of the image forming apparatus 100, a Y, M, C, or K is assigned at the end of the reference symbol to indicate color, but when describing an item that is common for all four colors, the letters YMCK are omitted. Here, four colors are assumed, but the present invention is applicable to any image forming apparatus using two or more toners.

The image forming apparatus 100 is provided with an original placement unit 500, an image reading unit 600, an image signal processing unit 1000, a laser writing unit 700, an image forming unit 800, and an unshown feeding unit. In particular, the image forming apparatus 100 forms an image on a printing medium using image signals that have been outputted from the image signal processing unit 1000 functioning as an image processing apparatus.

The image reading unit 600 scans the original placed on the original placement unit 500, reads an image of the original using an image sensor 15, and outputs image data of the original image. The image signal processing unit 1000 performs image processing on the input image signals, which have been inputted from the image reading unit 600, and outputs output image signals. After being temporarily stored in a memory 900, the output image signals are inputted to the laser writing unit 700. Processing is performed in an equivalent manner in regard to external input image signals that have been inputted from an external input device 2000 connected to a host computer or the like.

As indicated in FIG. 1, the image forming unit 800 is provided with four image forming stations corresponding to YMCK respectively. The laser writing unit 700 is provided with a drive motor 71, a polygon mirror 72, an f-theta lens 73, mirrors 74, 75, and 76, and an unshown semiconductor laser. The drive motor 71 is a drive source for driving the polygon mirror 72. Laser beams corresponding to image signals pass through these optical components to expose the surface of a photosensitive drum 17, thereby forming an electrostatic latent image.

The photosensitive drum 17 is a drum type electrographic photosensitive member and is driven by a drive motor (not shown in diagram) so as to rotate in the arrow direction. A primary charging device 19 uniformly charges the surface of the photosensitive drum 17. A development device 20 forms a toner image by using toner to develop the electrostatic latent image on the photosensitive drum 17. The toner image that is formed on the photosensitive drum 17 undergoes primary transfer from the photosensitive drum 17 to an intermediate transfer member 30. A primary transfer device 22 is arranged to facilitate this primary transfer. The primary transfer device 22 is provided with a primary transfer roller, and a voltage of an opposite polarity to the polarity of the toner is applied to the primary transfer roller. A drum cleaner 24 removes toner (residual toner) that remains on the surface of the photosensitive drum 17 after primary transfer.

The toner images of four colors layered on the intermediate transfer member 30 are transported to a secondary transfer device 54 by the rotation of the intermediate transfer member 30, then undergo secondary transfer collectively onto a transfer material 23 that has been transported in by a feeding transport device (not shown in diagram). The secondary transfer device 54 is provided with a secondary transfer outer roller 50 and a secondary transfer inner roller 51. These form a nip area while sandwiching the intermediate transfer member 30. Secondary transfer is executed by the four-color toner image on the intermediate transfer member 30 and the transfer material 23 passing through the nip area. To facilitate secondary transfer, a voltage is applied to the secondary transfer outer roller 50 also. An intermediate transfer member cleaner 27 removes toner (residual toner) that remains on the surface of the intermediate transfer member 30 after secondary transfer.

The transfer material 23 onto which the four-color toner image has been transferred is transported to a fixing device 26. The fixing device 26 applies heat and pressure to the toner image to fix it to the transfer material 23.

Description is given regarding the image signal processing unit 1000 using FIG. 2. A color conversion unit 1001 functions as a color conversion unit that converts the inputted image signals to image signals of a color space of the image forming apparatus. For example, the color conversion unit 1001 color converts an input image signal S (RGB) to SiY (1), SiM (1), SiC (1), and SiK (1). This is processing in which the color space (RGB) of the input image signal is converted to the color space (YMCK) of toner. In this way, the image signals obtained by conversion by the color conversion unit are a yellow image signal SiY (1), a magenta image signal SiM (1), a cyan image signal SiC (1), and a black image signal SiK (1). For example, each of these image signals is an 8-bit signal indicating a value from 0 to 255. Furthermore, each of the image signals forms a set for each pixel.

An image area division unit 1005 functions as a division unit that divides image signals of a predetermined hue area from among the image signals obtained by conversion by the color conversion unit. For example, the image area division unit 1005 performs image area division on the input image signals SiY (1), SiM (1), SiC (1), and SiK (1). Image area division is a process in which image signals of a predetermined hue area are divided from among the image signals SiY (1), SiM (1), SiC (1), and SiK (1) and outputted as B_SiM (1) and B_SiC (1). Predetermined hue area refers to a hue area in which, among multiple areas of different hues, a toner transfer failure tends to occur at concave portions that exist on a printing surface of the printing medium. For example, an image area, which is a blue hue area and in which SiY (1)=0, SiK (1)=0, SiM (1)≠0, and SiC (1)≠0, is divided from SiY (1), SiM (1), SiC (1), and SiK (1). In this way, the division unit divides off hue areas where the value indicated by the yellow image signal SiY (1) is zero and the value indicated by the black image signal SiK (1) is also zero.

The remaining image signals SiY (1), SiM (1), SiC (1), and SiK (1) that did not undergo image area division by the image area division unit 1005 are converted to SiY (2), SiM (2), SiC (2), and SiK (2) according to corresponding lookup tables 1002Y, 1002M, 1002C, and 1002K. The image signals SiY (2), SiM (2), SiC (2), and SiK (2) are inputted to a final image processing unit 1007. On the other hand, the image signals B_SiM (1) and B_SiC (1), which have undergone image area division, are converted to B_SiM (2) and B_SiC (2) according to corresponding lookup tables 1003M and 1003C and inputted to the final image processing unit 1007.

The final image processing unit 1007 performs a dithering process by merging the image signals SiY (2), SiM (2), SiC (2), SiK (2), B_SiM (2), and B_SiC (2) and outputs final output image signals SiY (3), SiM (3), SiC (3), and SiK (3) to the memory 900.

A texture processing unit 1010 changes the lookup tables 1003M and 1003C according to differences in the surface properties of the transfer material 23. For example, in regard to a transfer material 23 having drastic surface roughness, lookup tables 1003M and 1003C are selected such that the amount of toner applied is more than usual. The image signals B_SiM (1) and B_SiC (1) are converted according to the lookup tables 1003M and 1003C such that the amount of toner applied increases, thereby becoming input image signals B_SiM (2) and B_SiC (2). The lookup tables 1003M and 1003C function as a correction unit that performs correction on image signals such that the toner amount is increased by an increase amount corresponding to the smoothness of the printing medium for the image signals of a predetermined hue area divided by the division unit.

Information indicating surface properties of the transfer material 23, which is information used as a reference for selecting the lookup tables 1003M and 1003C, is inputted to the texture processing unit 1010 from a paper type specifying unit 1011 or a smoothness measuring device 1012. Information indicating the paper type specified by the user is inputted to the paper type specifying unit 1011, which is one example of a specifying unit that specifies a paper type of the printing medium. Information indicating paper type is information in which paper type or smoothness can be directly or indirectly specified, and may be a general name of the printing medium (examples: plain paper, recycled paper, and the like), product name, or an identification code, or may be the level of smoothness itself. The texture processing unit 1010 determines from the paper type information whether or not the paper type of the transfer material 23 is registered in advance as a paper having poor surface texture, and decides whether or not to change the lookup tables 1003M and 1003C according to the determination result. The texture processing unit 1010 functions as a determination unit that determines whether or not the smoothness of the paper type specified by the specifying unit is less than a predetermined threshold. The texture processing unit 1010 functions as a correction unit that increases the toner amount for the image signals of the predetermined hue area if the smoothness of the paper type specified by the specifying unit is equal to or less than the threshold, and does not increase the toner amount for the image signals of the predetermined hue area if the smoothness of the paper type specified by the specifying unit is greater than the threshold.

It should be noted that the texture processing unit 1010 may be provided with a table that indicates in advance a relationship between paper types and smoothness, or may be a component in which information of paper types having poor textures is stored in a ROM or the like.

The smoothness measuring device 1012 is a measuring unit that measures the smoothness of the printing medium, and may be provided instead of the paper type specifying unit 1011. The smoothness measuring device 1012 may be provided within a paper feed cassette or on a transport path of the image forming apparatus 100 to measure the smoothness of the surface of the transfer material 23 and output the measurement result (smoothness information) to the texture processing unit 1010. The texture processing unit 1010 compares the smoothness indicated by the smoothness information and the predetermined threshold, and decides whether or not to change the lookup tables 1003M and 1003C according to the comparison result. The texture processing unit 1010 functions as a determination unit that determines whether or not the smoothness measured by the measuring unit is less than a predetermined threshold. Furthermore, the texture processing unit 1010 functions as a correction unit that increases the toner amount for the image signals of the predetermined hue area if the smoothness measured by the measuring unit is equal to or less than the threshold, and does not increase the toner amount for the image signals of the predetermined hue area if the smoothness measured by the measuring unit is greater than the threshold.

According to testing by the inventors, a threshold of smoothness is approximately 25. If the smoothness is 25 or less, the texture processing unit 1010 selects a lookup table that increases the toner amount, and if the smoothness is greater than 25 it selects a lookup table that does not increase the toner amount. In this way, the texture processing unit 1010 functions as a correction unit that increases the toner amounts by changing the lookup tables applied on the image signals of the predetermined hue areas.

Figure 3A:
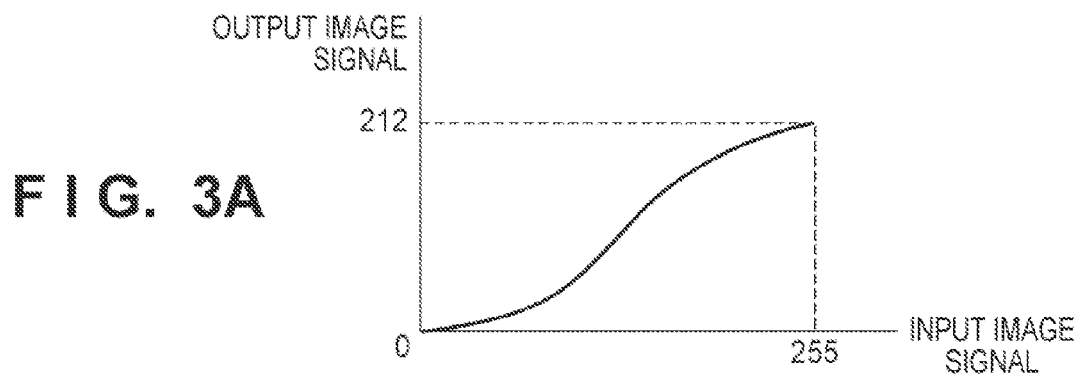
FIGS. 3A and 3B are diagrams indicating lookup tables.
Figure 3B:
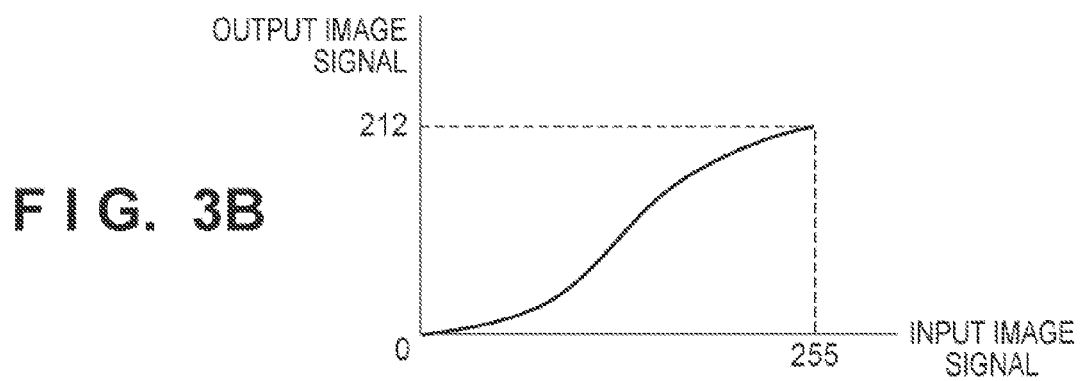

FIGS. 3A and 3B show lookup tables 1003 of cases where there is no necessity for texture processing. In particular, FIG. 3A indicates the lookup table 1003M for magenta and FIG. 3B indicates the lookup table 1003C for cyan. When it is determined that the paper type of the transfer material 23 is a paper type having good surface properties, the texture processing unit 1010 selects the lookup tables indicated in FIG. 3A and FIG. 3B and applies them to B_SiM (1) and B_SiC (1). That is, the input image signal B_SiM (1) is converted to the output image signal B_SiM (2) according to the lookup table 1003M. Similarly, the input image signal B_SiC (1) is converted to the output image signal B_SiC (2) according to the lookup table 1003C.

Figure 4A:
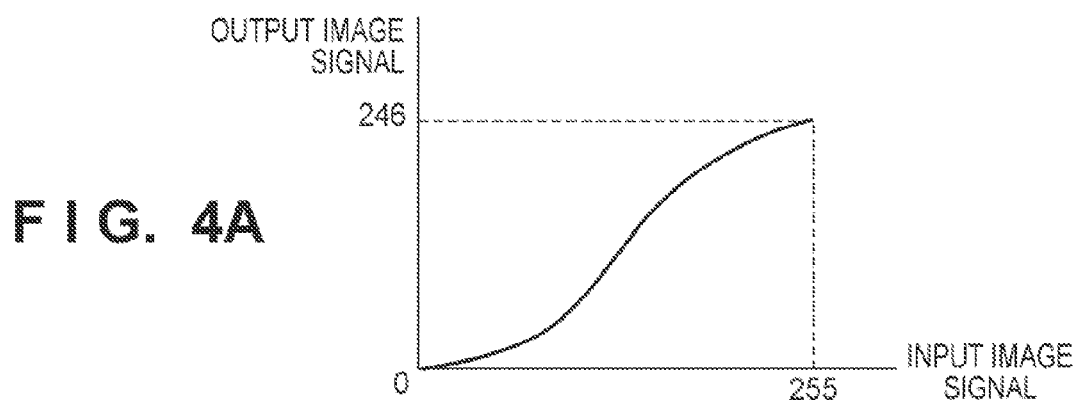
FIGS. 4A and 4B are diagrams indicating lookup tables.
Figure 4B:
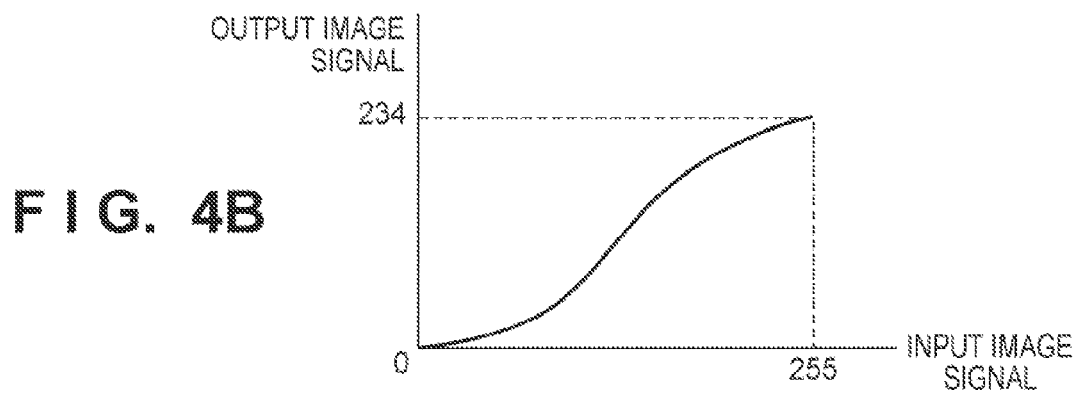

FIGS. 4A and 4B show lookup tables 1003 of cases where texture processing is necessary. In particular, FIG. 4A indicates the lookup table 1003M for magenta and FIG. 4B indicates the lookup table 1003C for cyan. When it is determined that the paper type of the transfer material 23 is not a paper type having good surface properties, the texture processing unit 1010 selects the lookup tables indicated in FIG. 4A and FIG. 4B and applies them to B_SiM (1) and B_SiC (1).

Compared to FIG. 3A, in FIG. 4A the values of the output image signals have increased overall with respect to the input image signals. In this example, a rate of increase PSiM is 246/212 ($\approx$1.2). Compared to FIG. 3B, in FIG. 4B the values of the output image signals have increased overall with respect to the input image signals. In this example, a rate of increase PSiC is 234/212 ($\approx$1.1). It should be noted that according to testing by the inventors, these rates of increase are 1.3 or less. This is because detrimental effects such as the image becoming undesirably dark cannot be disregarded when the rate of increase exceeds 1.3. By setting an upper limit value to the rate of increase of toner amounts in this manner, fluctuations in the hue and darkness in the predetermined hue areas can be kept within an allowable range. In a case where toner increases are to be achieved using lookup tables, the lookup tables are designed so as to fulfill a following condition. A relationship is established between a value S1 of the image signal prior to correction according to the lookup table and a value S2 of the image signal after correction in which:

$$S2 \leq S1 \times 1.3.$$

Figure 5:
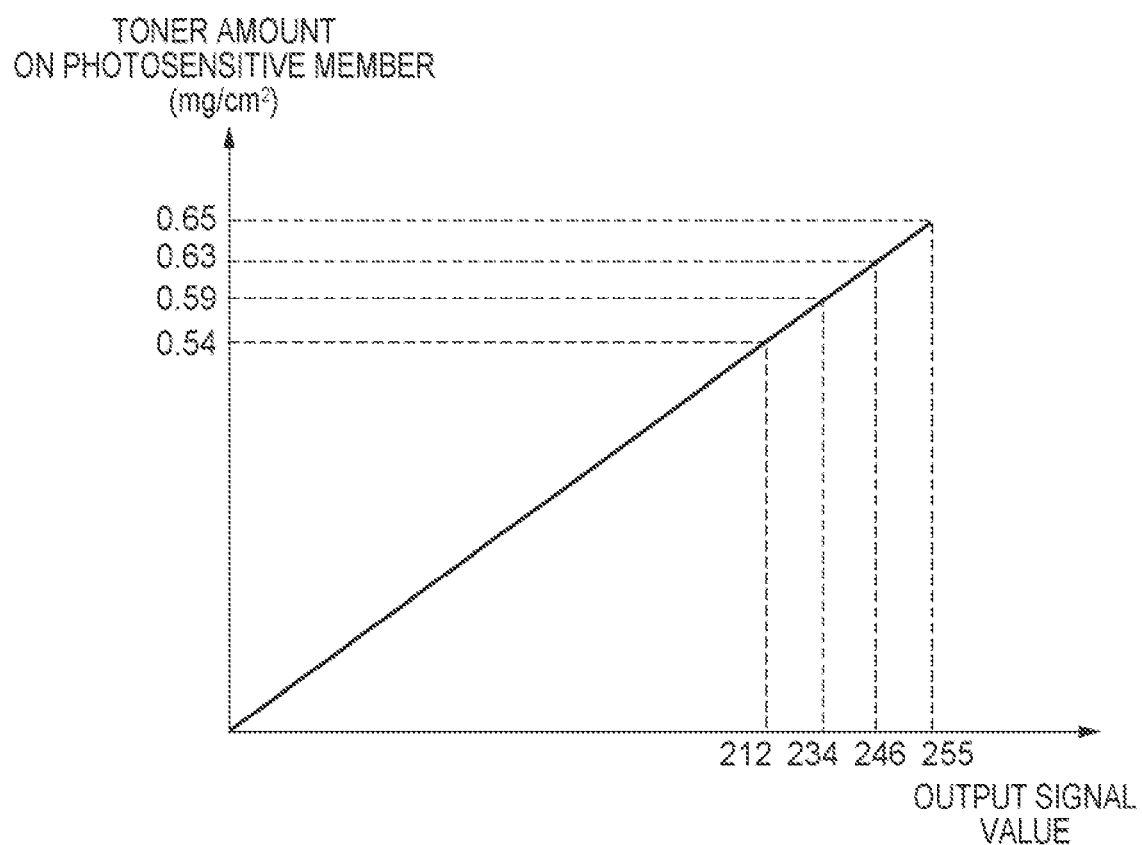
FIG. 5 is a diagram indicating a relationship between output signal values and toner amounts in solid color portions.
Figure 8A:
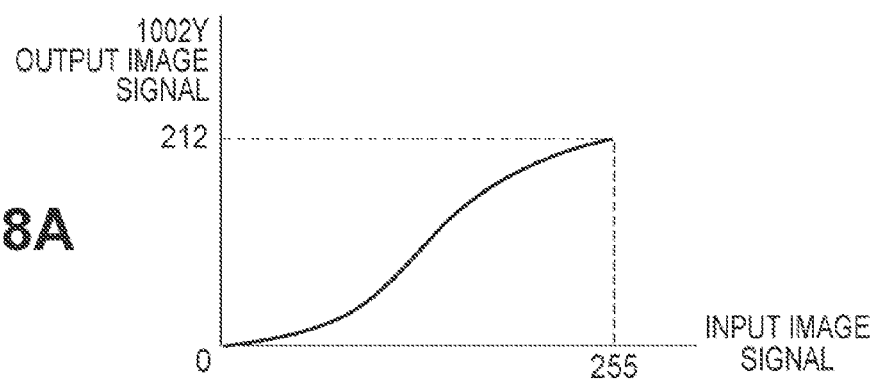
FIGS. 8A to 8D are diagrams indicating lookup tables.
Figure 8B:
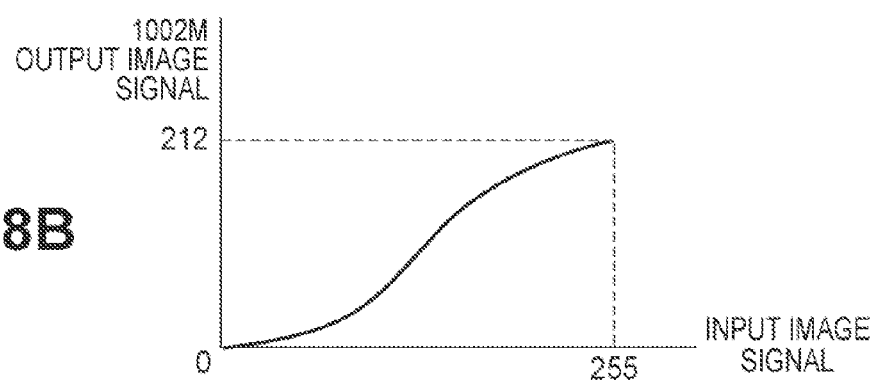
Figure 8C:
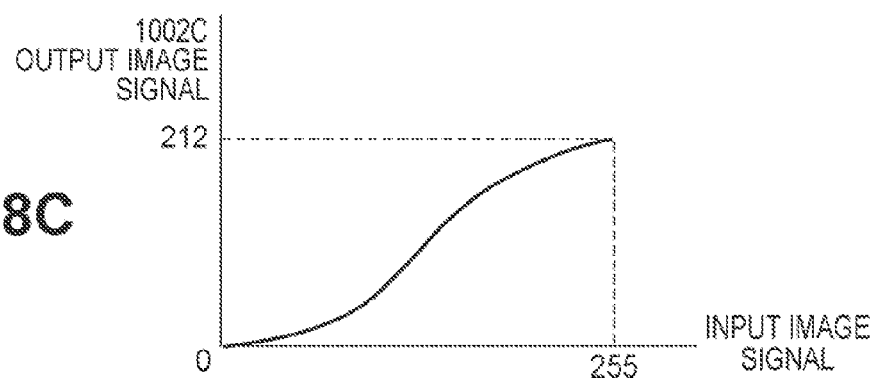
Figure 8D:
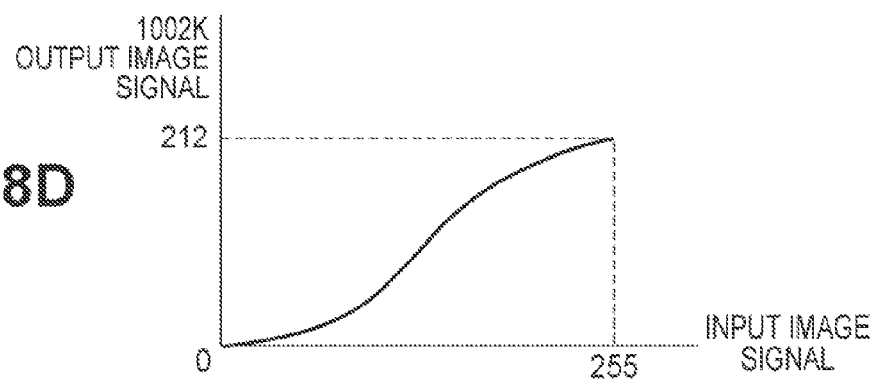

FIG. 5 is a diagram indicating a relationship between output image signals indicated in FIGS. 3 and 4 and toner amounts on the intermediate transfer member 30. As is evident in FIG. 5, by changing the lookup table, the toner amount on the intermediate transfer member 30 at solid image areas of magenta increases from 0.54 mg/cm$^2$ to 0.63 mg/cm$^2$. Furthermore, by changing the lookup table, the toner amount on the intermediate transfer member 30 at solid image areas of cyan increases from 0.54 mg/cm$^2$ to 0.59 mg/cm$^2$.

Here, description is given regarding reasons for increasing toner application amounts by overwriting the lookup table to ensure that texture faults, which occur on papers having a poor surface texture, do not become conspicuous.

FIG. 6 indicates a state in which texture faults occur on a transfer material having large surface roughness (a paper having poor texture). Texture faults refers to a phenomenon in which toner does not adhere sufficiently to concave portions formed on the surface of a transfer material when that surface has insufficient smoothness. In areas where texture faults have occurred, not only does the lightness of the image deviate undesirably from the ideal (original image) brightness, but even the hue deviates undesirably from the ideal hue.

As indicated in FIG. 6, with a transfer material 23 having roughness, the toner is not sufficiently transferred at concave portions. Since the concave portions are too far apart from the intermediate transfer member 30, the toner does not sufficiently fly to the concave portions due to the secondary transfer electric field. At the concave portions indicated in FIG. 6, only the cyan toner is transferred at the concave portions, and the magenta toner is not transferred at the concave portions. Furthermore, since a lot of the magenta toner remains on the intermediate transfer member 30, the recovery container of the intermediate transfer member cleaner 27 tends to become full easily.

FIG. 7A is a diagram giving a pattern representation of solid color portions in a case where lookup tables such as those in FIG. 3A and FIG. 3B are used for texture faults such as in FIG. 6. There is little toner transferred from the intermediate transfer member 30 at the concave portion of the surface of the transfer material 23. Here, for the purpose of simplification, a case is used in which all the cyan toner and magenta toner is transferred at the convex portions, while at the concave portion all the cyan toner is transferred but no magenta toner is transferred.

FIG. 7B is a diagram indicating the toner image in FIG. 7A after fixing. As is evident, for the convex portions, the cyan toner and the magenta toner are mixed by the fixing process, thereby forming a blue image as targeted. Furthermore, in the concave portion the cyan toner is fixed and a cyan image is formed different from the target. For this reason, a difference in hue is produced between the concave portion and the convex portions.

In addition to the difference in hue, a difference in lightness exists between the cyan image portion of the concave portion and the blue image portions of the convex portions. In this example, the lightness of the blue image portions is L*:17, and the lightness of the cyan image of the concave portion is L*:51. Here, L*, which is used as a reference of lightness, is based on the lightness reference in the CIEL*a*b* color space. Thus, L*=100 is white and L*=0 is black. In this way, as well as the conspicuity of the texture faults due to hue differences at the concave portions and convex portions, there also exists a conspicuity of the texture fault due to the lightness difference of ΔL*:34.

FIG. 7C is a diagram giving a pattern representation of solid color portions in a case where lookup tables such as those in FIG. 4A and FIG. 4B are used for texture faults such as in FIG. 6. Compared to FIG. 7A, the toner amount transferred by the intermediate transfer member 30 has increased at the concave portion and convex portions of the surface of the transfer material 23.

FIG. 7D is a diagram indicating the toner image in FIG. 7C after fixing. As is evident, the lightness of the blue image portions of the convex portions is L*:15, and the lightness of the cyan image of the concave portion is L*:40. That is, compared to FIG. 7B, in FIG. 7D the difference in lightness between the concave portion and the convex portions has been reduced from L*:34 to ΔL*:25. In FIG. 7A and FIG. 7C, the amounts of magenta toner remaining on the intermediate transfer member 30 without undergoing secondary transfer are equivalent amounts. However, in FIG. 7C, since the toner amount has been increased according to the lookup table, the height of the toner that has undergone primary transfer onto the intermediate transfer member 30 has increased, and the distance to the transfer material 23 has become shorter. Accordingly, in FIG. 7C, the toner amounts of the concave portion and the convex portions on the transfer material 23 have also increased compared to FIG. 7A. Due to this, compared to FIG. 7B, the difference in lightness between the concave portion and the convex portions is reduced in FIG. 7D. As described above, the conspicuity of the texture faults originates in the difference of hue and the difference of lightness between the concave portions and the convex portions. Accordingly, by reducing the difference of lightness, the conspicuity of texture faults is reduced for the image overall.

From the input image signals SiY (1), SiM (1), SiC (1), and SiK (1), the image area division unit 1005 divides off only the areas that are SiY (1)=0 and SiK (1)=0, that is, only blue areas. Then, correction is performed on B_SiM (1) and B_SiC (1) so that the toner application amounts are increased according to lookup tables selected according to the surface properties of the transfer material 23, thereby generating B_SiM (2) and B_SiC (2).

On the other hand, in regard to areas other than the blue areas, there is no particular necessity to change the lookup tables according to differences in surface properties. For this reason, SiY (1), SiM (1), SiC (1), and SiK (1), which are not blue areas, are converted to SiY (2), SiM (2), SiC (2), and SiK (2) according to the lookup tables 1002Y, 1002M, 1002C, and 1002K indicated in FIGS. 8A to 8D. Reasons thereof are discussed below.

Figure 9A:
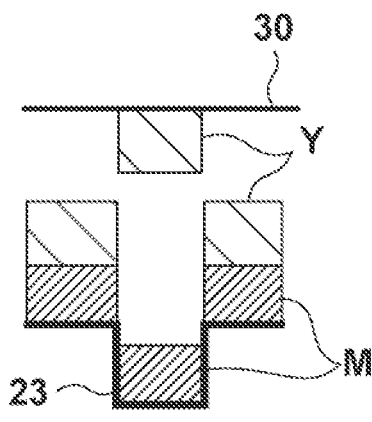
FIGS. 9A to 9D are schematic diagrams indicating conditions of texture faults of a red image.

FIG. 9A is a diagram giving a pattern representation of solid color portions of a red image in a case where lookup tables such as those in FIG. 3A and FIG. 3B are used for texture faults. There is less toner transferred from the intermediate transfer member 30 at the concave portion of the surface of the transfer material 23 than at the convex portions. As in FIG. 7A, all the magenta toner and yellow toner is transferred at the convex portions in FIG. 9A. All the magenta toner is transferred at the concave portion, but no yellow toner is transferred there.

Figure 9B:
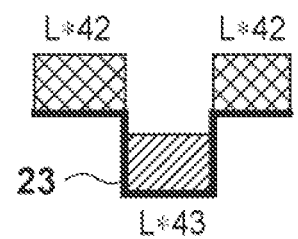

FIG. 9B is a diagram indicating the toner image in FIG. 9A after fixing. As is evident, at the convex portions, a red image is formed due to the mixing of the yellow toner and the magenta toner. The lightness of this red image area is L*:42. On the other hand, the lightness of the magenta image at the concave portion is L*:43. That is, although there is conspicuity of texture faults due to hue differences at the concave portions and convex portions, the lightness difference is ΔL*:1, and therefore there is almost no conspicuity of texture faults due to lightness difference. Thus, compared to the blue image of FIG. 7B, the texture faults tend not to be conspicuous in the red image of FIG. 9B for the entire image.

Figure 9C:
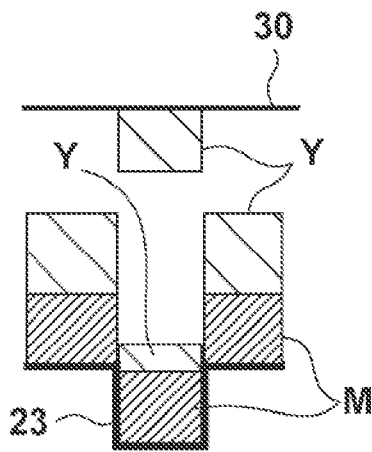

FIG. 9C is a diagram giving a pattern representation of solid color portions in a case where lookup tables such as those in FIG. 4A and FIG. 4B are used. Compared to FIG. 9A, in FIG. 9C the toner transferred by the intermediate transfer member 30 has increased at the concave portion and convex portions of the surface of the transfer material 23.

Figure 9D:
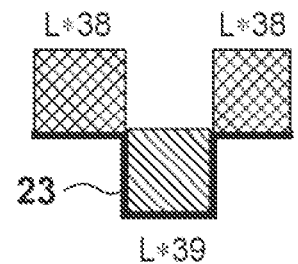

FIG. 9D is a diagram indicating the toner image in FIG. 9C after fixing. As is evident, the lightness of the red image portions of the convex portions is L*:38, and the lightness of the magenta image of the concave portion is L*:39. That is, compared to FIG. 9B, in FIG. 9D the difference in lightness between the concave portion and the convex portions remains as it is at ΔL*:1. This indicates that even if the toner amounts are uniformly increased at the concave portion and the convex portions, the effect of reducing the lightness difference is only ΔL*:1 or less. That is, even if the toner amounts are increased at the concave portions and the convex portions in the red image, there is only an extremely small effect of making texture faults become inconspicuous. From the perspective of suppressing toner consumption, it can be considered that it does not increase the toner amounts for area of hues such as red images.

Compared to FIG. 9B, in FIG. 9D the lightness of both the concave portion and the convex portions is low. Even if the toner amounts were increased, not only would the conspicuity of the texture faults not improve, overall the image may become an undesirable dark red. Accordingly, since there is no necessity to change the lookup tables for red image areas, the image area division unit 1005 does not perform image area division for red image areas.

FIGS. 10A to 10D are diagrams giving a pattern representation of cases of increasing toner amounts for a green image in a same manner as for the blue image in FIGS. 7A to 7D and the red image in FIGS. 9A to 9D. The green image is formed due to the mixing of the yellow toner and the cyan toner. FIG. 10A is a diagram indicating a state of secondary transfer in a case where the toner amount has not been increased according to the paper type. FIG. 10B is a cross-sectional view of a fixed image corresponding to FIG. 10A. As is evident, the lightness of the green image portions of the convex portions is L*:42, and the lightness of the cyan image of the concave portion is L*:51. Thus, the lightness difference is ΔL*9. Compared to the red image of FIG. 9B, the green image of FIG. 10B tends to have conspicuous texture faults due to the lightness difference. However, compared to the blue image of FIG. 7B where the lightness difference is ΔL*:34, the lightness difference of the green image indicated in FIG. 10B is ΔL*:9, which can be considered a small difference.

FIG. 10C is a diagram indicating a state of secondary transfer in a case where the toner amount has been increased according to the paper type. FIG. 10D is a cross-sectional view of a fixed image corresponding to FIG. 10C. According to FIG. 10D, the lightness of the images is similarly low as in both FIG. 7D and FIG. 9D, and therefore it is evident that the overall image will become dark. Accordingly, since there is only a small necessity to increase the amount of toner applied to make texture faults become less conspicuous in the green image areas as well, the image area division unit 1005 does not perform image area division for green image areas.

FIGS. 11A and 11B show a condition of texture faults in a case where black toner has been transferred. The image forming apparatus 100 transfers black toner as the lowest layer on the transfer material 23. This is because the black image forming station is positioned at the most downstream position in the movement direction of the circumferential surface of the intermediate transfer member 30. When a texture fault occurs as indicated in FIG. 11A, the toner that is transferred to the concave portion of the transfer material 23 is only black toner.

The lightness of black toner is low compared to the lightness of other toners. Looking at the cross-sectional view of the toner image after fixing indicated in FIG. 11B, there is almost no difference of lightness of the concave portion and the convex portions. Accordingly, in image areas formed by mixing black and other colors, the overall image becomes undesirably dark by increasing the toner amounts by changing the lookup tables. Accordingly, the image area division unit 1005 does not perform image area division on image areas of hues formed by mixing with black toner. That is, the image area division unit 1005 does not perform image area division for areas where black toner is applied, that is, for image areas where SiK (1)≠0.

On the other hand, the image forming apparatus 100 transfers yellow toner as the uppermost layer on the transfer material 23. This is because the yellow image forming station is arranged most upstream. FIGS. 9A to 9D and FIGS. 10A to 10D indicated examples in regard to a condition of texture faults in areas where yellow toner is applied. That is, in most cases there is a small lightness difference between concave portions where yellow toner is not applied and convex portions where yellow toner is applied. For suppressing overall undesirable darkening of the image caused by toner amount increases due to changing the lookup tables, it can do without carrying out toner amount increases. Accordingly, the image area division unit 1005 does not perform image area division for areas where yellow toner is applied in the image areas, that is, for image areas where SiY (1)≠0.

In light of the above considerations, the areas to be targeted for image area division are the blue image areas. More generally, a first image area division condition is that areas to be targeted for image area division are areas of a hue formed by superimposing toners of at least two colors. Further still, as a second image area division condition, when comparing equivalent amounts of applied amounts of the toners of two colors, a relationship between a lightness L*P of a toner P that is applied on a close side to the transfer material 23 and a lightness L*Q of a toner Q applied on a far side from the transfer material 23 is that:

$$L^*P > L^*Q.$$

Furthermore, the second image area division condition may be that:

$$L^*P < L^*Q \text{ and } L^*Q/L^*P < 1.3.$$

The image area division unit 1005 carries out control of toner amount increases according to the smoothness (paper type, surface properties) of the transfer material 23 for areas that satisfy the first image area division condition and the second image area division condition, thereby enabling texture faults to be mitigated.

Description is given regarding image processing according to the present embodiment using FIG. 12. At S1201, the image signal processing unit 1000 controls the texture processing unit 1010 to obtain information of smoothness from the paper type specifying unit 1011 or the smoothness measuring device 1012.

At S1202, the image signal processing unit 1000 uses the texture processing unit 1010 to select a lookup table corresponding to the smoothness. It should be noted that the texture processing unit 1010 may overwrite the lookup table so as to achieve a toner increase corresponding to the smoothness.

At S1203, the image signal processing unit 1000 uses the color conversion unit 1001 to convert the color space of the image signals inputted from the scanner or host computer to the color space of the image forming apparatus 100.

At S1204, the image signal processing unit 1000 uses the image area division unit 1005 to divide off image signals of a predetermined hue area from among the converted image signals.

At S1205, the image signal processing unit 1000 applies the lookup table selected by threshold texture processing unit 1010 on the image signals that were divided off by the image area division unit 1005. Furthermore, the image signal processing unit 1000 applies lookup tables that have been set in advance to image signals that were not divided off by the image area division unit 1005.

At S1206, the image signal processing unit 1000 uses the final image processing unit 1007 to execute final processing. Final processing refers to a process of merging image signals that were not divided off by the image area division unit 1005 and image signals that were divided off, as well as to dithering processes and the like.

According to the present invention, image signals are increased so as to increase the toner amounts at hue areas, among multiple areas having different hues, where toner transfer failures tend to occur at concave portions on the surface of the medium. This enables a toner image to be sufficiently transferred to a printing medium having poor surface properties. Furthermore, since processing or mechanisms for smoothing the printing medium by using a white toner or transparent toner in advance are unnecessary, there are advantageous aspects in terms of costs compared to heretofore. Furthermore, since it is not necessary to implement an elastic member as the surface material of the intermediate transfer member or the like, there are advantageous aspects in terms of costs compared to heretofore.

For example, since texture faults tend to be conspicuous in blue image areas, the amount of toner applied is increased. On the other hand, in image areas of hues different from blue hues, which are areas where texture faults tend not to be conspicuous from the beginning, there is a risk that undesirable image darkening will occur accompanying increases in toner amounts. Accordingly, it is acceptable not to carry out increases in the toner amounts for image areas of hues different from these blue hues. By limiting the areas in which toner amounts are increased to specific hue areas, it is possible to limit areas in which undesirable hue or brightness fluctuations may occur to the specific hue areas. That is, even when the toner amounts are increased so that texture faults do not become conspicuous, fluctuations in the hue and brightness of the overall output image become minor.

It should be noted that dividing off blue hue areas from image signals can be achieved by dividing off hue areas where the value indicated by the yellow image signal SiY (1) is zero and the value indicated by the black image signal SiK (1) is also zero, and therefore there is the merit that processing is kept relatively simple.

Furthermore, in regard to the smoothness of the printing medium, the smoothness may be determined from the paper type by the operator inputting a paper type whose smoothness is determinable, or by directly measuring the smoothness with a sensor. In particular, the former is more advantageous than the latter in terms of costs since it can be achieved through a user interface of a printer driver, which is operated through a host computer or a touch panel provided on the image forming apparatus. On the other hand, the latter is more advantageous than the former in that it is not influenced by operator input errors or the like.

Increases in toner amounts can be easily achieved using a lookup table. As is well known, lookup tables are used for gamma corrections and the like and are ordinarily provided in image processing apparatuses. Accordingly, there is the merit that toner amount increases also can be easily achieved by selecting a lookup table according to smoothness. It should be noted that rather than a lookup table, the toner amounts can also be increased using a function or program-based arithmetic processing that functions similarly.

In the present embodiment, the image processing apparatus is achieved as the image signal processing unit 1000 installed in the image forming apparatus 100, but this may also be achieved by a printer driver or the like of a host computer.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-128641, filed Jun. 8, 2011 which is hereby incorporated by reference herein in its entirety.

What is claimed is:

1. An image processing apparatus comprising:
a color conversion unit that converts inputted image signals to image signals of a color space of an image forming apparatus;
a division unit that divides image signals of a predetermined hue area from among the image signals obtained by conversion by the color conversion unit; and
a correction unit that performs correction on the image signals such that a toner amount is increased by an increase amount corresponding to a smoothness of a printing medium for the image signals of the predetermined hue area divided by the division unit,
wherein the predetermined hue area is a hue area in which, among multiple areas of different hues, a toner transfer failure tends to occur at concave portions that exist on a printing surface of the printing medium,
the predetermined hue area is a hue area to be formed by superimposing two toners of different colors, and
when equivalent amounts of each toner of the two colors are compared, a relationship between a lightness $L^*P$ of a toner P that is applied on a side close to the printing medium and a lightness $L^*Q$ of a toner Q applied on a side far from the printing medium is that:

$$L^*P > L^*Q$$

or $$L^*P < L^*Q \text{ and } L^*Q/L^*P < 1.3.$$

2. The image processing apparatus according to claim 1, wherein the predetermined hue area is a blue hue area.

3. The image processing apparatus according to claim 2, wherein the image signals obtained by conversion by the color conversion unit are a yellow image signal, a magenta image signal, a cyan image signal, and a black image signal, and
the division unit divides off hue areas where a value indicated by the yellow image signal is zero and a value indicated by the black image signal is also zero.

4. The image processing apparatus according to claim 1, further comprising:
a specifying unit that specifies a paper type of the printing medium, and
a determination unit that determines whether or not a smoothness of the paper type specified by the specifying unit is a predetermined threshold or less,
wherein the correction unit increases the toner amount for the image signals of the predetermined hue area if the smoothness of the paper type specified by the specifying unit is equal to or less than the threshold, and does not increase the toner amount for the image signals of the predetermined hue area if the smoothness of the paper type specified by the specifying unit is greater than the threshold.

5. The image processing apparatus according to claim 1, further comprising:
a measuring unit that measures a smoothness of the printing medium, and
a determination unit that determines whether or not the smoothness measured by the measuring unit is a predetermined threshold or less,
wherein the correction unit increases the toner amount for the image signals of the predetermined hue area if the smoothness measured by the measuring unit is equal to or less than the threshold, and does not increase the toner amount for the image signals of the predetermined hue area if the smoothness measured by the measuring unit is greater than the threshold.

6. The image processing apparatus according to claim 4, wherein the threshold is 25.

7. The image processing apparatus according to claim 1, wherein the correction unit increases the toner amount by changing a lookup table applied on the image signals of the predetermined hue area.

8. The image processing apparatus according to claim 7, wherein the lookup table is a lookup table designed so that a relationship between a value S1 of the image signals prior to being corrected by the correction unit and a value S2 of the image signals after being corrected by the correction unit is satisfied, the relationship being:

$$S2 \leq S1 \times 1.3.$$

9. An image forming apparatus, comprising:
a color conversion unit that converts inputted image signals to image signals of a color space of an image forming apparatus;
a division unit that divides image signals of a predetermined hue area from among the image signals obtained by conversion by the color conversion unit;
a correction unit that performs correction on the image signals such that a toner amount is increased by an increase amount corresponding to a smoothness of a printing medium for the image signals of the predetermined hue area divided by the division unit; and
an image forming unit that forms an image on a printing medium using the image signals corrected by the correction unit, wherein the predetermined hue area is a hue area in which, among multiple areas of different hues, a toner transfer failure tends to occur at concave portions that exist on a printing surface of the printing medium, the predetermined hue area is a hue area to be formed by superimposing two toners of different colors, and when equivalent amounts of each toner of the two colors are compared, a relationship between a lightness $L*P$ of a toner P that is applied on a side close to the printing medium and a lightness $L*Q$ of a toner Q applied on a side far from the printing medium is that:

$L*P > L*Q$ or $L*P < L*Q$ and $L*Q/L*P < 1.3$.

10. An image processing apparatus comprising:

a color conversion unit that converts inputted image signals to image signals of a color space of an image forming apparatus;

a division unit that divides image signals of a predetermined hue area from among the image signals obtained by conversion by the color conversion unit; and a correction unit that performs correction on the image signals such that a toner amount is increased by an increase amount corresponding to a smoothness of a printing medium for the image signals of the predetermined hue area divided by the division unit, wherein the predetermined hue area is a hue area in which, among multiple areas of different hues, a toner transfer failure tends to occur at concave portions that exist on a printing surface of the printing medium, the correction unit increases the toner amount by changing a lookup table applied on the image signals of the predetermined hue area, and the lookup table is a lookup table designed so that a relationship between a value S1 of the image signals prior to being corrected by the correction unit and a value S2 of the image signals after being corrected by the correction unit is satisfied, the relationship being:

$S2 \leq S1 \times 1.3$.

* * * * *